US005753341A

United States Patent [19]

Peng

[11] Patent Number: 5,753,341

[45] Date of Patent: May 19, 1998

[54] ARTISTICALLY STAINED GLASS COPPER FOILED MIRROR AND FRAME ASSEMBLY

[75] Inventor: Jer-Jyh Peng, Chungli, Taiwan

[73] Assignee: Creative Design Co., Ltd., Li Shyi Wei Chungli, Taiwan

[21] Appl. No.: 735,267

[22] Filed: Oct. 22, 1996

[51] Int. Cl.[6] .......... B32B 3/02

[52] U.S. Cl. .......... 428/122; 428/14; 428/912.2; 40/743; 40/798

[58] Field of Search .......... 428/122, 14, 912.2; 40/743, 768, 798, 799; 52/785.1

[56] References Cited

U.S. PATENT DOCUMENTS 589,695 9/1897 Carraine .......... 40/768

683,711 10/1901 Silverberg .......... 40/798

3,274,721 9/1966 Dreyer .......... 428/912.2

4,192,905 3/1980 Scheibal .......... 428/912.2

*Primary Examiner*—Alexander Thomas

*Attorney, Agent, or Firm*—Bacon & Thomas

[57] ABSTRACT

An artistically stained glass copper-foiled mirror and frame assembly has a mirror portion and an attachable decorative bracket and an outer frame. The mirror portion can be sand blasted along the boundary thereof and the decorative bracket has a removable central portion to permit the mirror portion to be exposed. The decorative bracket is equipped with decorative patterns made of various materials that are created and worked according to their natural features to make the decorative patterns versatile and fascinating. The mirror and the decorative bracket are enclosed by the outer frame and retained in the frame by retaining members so that a damaged mirror can be replaced with ease.

4 Claims, 3 Drawing Sheets

ARTISTICALLY STAINED GLASS COPPER FOILED MIRROR AND FRAME ASSEMBLY

BACKGROUND OF THE INVENTION

The present invention relates to an artistically stained glass copper-foiled mirror and frame assembly. Such mirror and frame structure can be mass product in a fast and economical way so as to make the product more competitive in commercial markets.

A conventional artistically stained glass copper-foiled mirror and frame assembly 11, as shown in FIG. 1 is made up of a glass mirror 12, a plurality of decorative patterns 13 and a metallic frame 14. The main production process includes the steps of first designing decorative patterns 13 of the one-piece glass mirror 12 on the rim thereof; then removing the designed patterns from the glass mirror to create a contour of pattern; next the decorative patterns 13 of glass are produced and the processed decorative patterns 13 are fitted into the left contour of patterns on the glass mirror 12 by adhesive material; at least, a frame 14 is attached to the glass mirror so as to cover up the joining traces on the glass mirror 11.

Such production process has the following disadvantages: 1. The integral structure of a glass mirror 12 is spoiled by first cutting out a designed pattern on the rim of the mirror, thus increasing the chance of breaking the mirror. 2. The fragile mirror 12 is easily broken or scratched in the process of working, making the processing difficult and increases of production cost. 3. Due to the fragibility of glass material, decorative patterns 13 can almost be designed in a linear form, so no curvilinear or corners can be applied to the design in order to avoid breaking of the mirror in delivery. 4. The mirror 12 and the decorative pattern 13 are joined by first covering it with adhesive copper foil and then welding by high temperature melting of tine, and further processing by chemicals. The thickness is only 3 mm, so the joining of the mirror and the decorative patterns 13 will certainly be eroded or broken within 6 months. Furthermore, the coated mercury on the back of the mirror will easily come off, thus making the mirror malfunctional. 5. The finished product does not have an outer frame and the outermost rim is only joined by a rather thin copper foil and soldering tin which easily comes off when cleaned or pulled accidentally.

SUMMARY OF THE INVENTION

The primary object of the present invention is to provide a novel artistically stained glass copper-foiled mirror and frame assembly which is produced at low cost and is more competitive commercially.

Another object of the present invention is to provide a novel artistically stained glass copper-foiled mirror and frame assembly which permits the colored decorative patterns to be processed in a more delicate and versatile manner without destruction of the mirror itself.

One further object of the present invention is to provide a novel mirror and frame assembly which can be mass produced in a fast and economical manner.

DETAILED DESCRIPTION OF THE PREFERRED EMBODIMENTS

Figure 1:
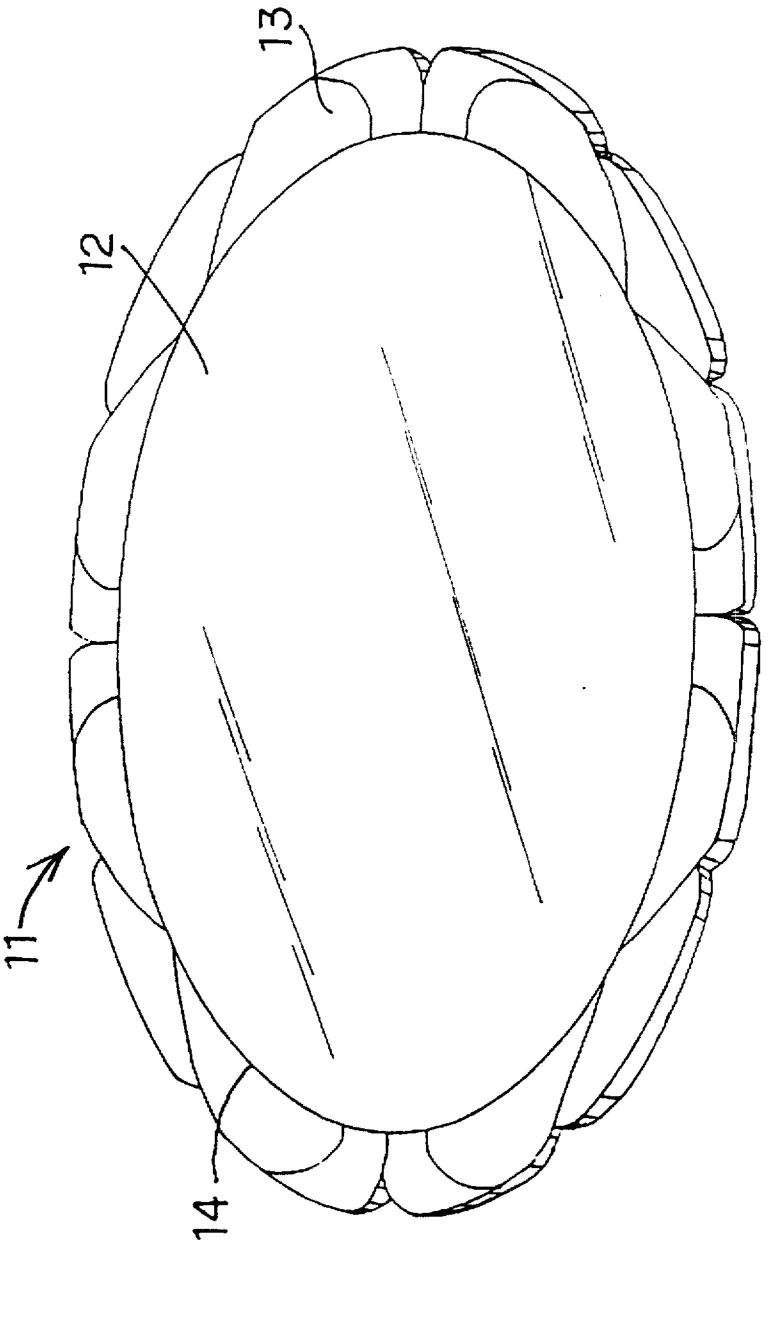
PRIOR ART FIG. 1
FIG. 1 is a perspective view showing a conventional artistically stained glass copper-foiled mirror and frame assembly.
Figure 2:
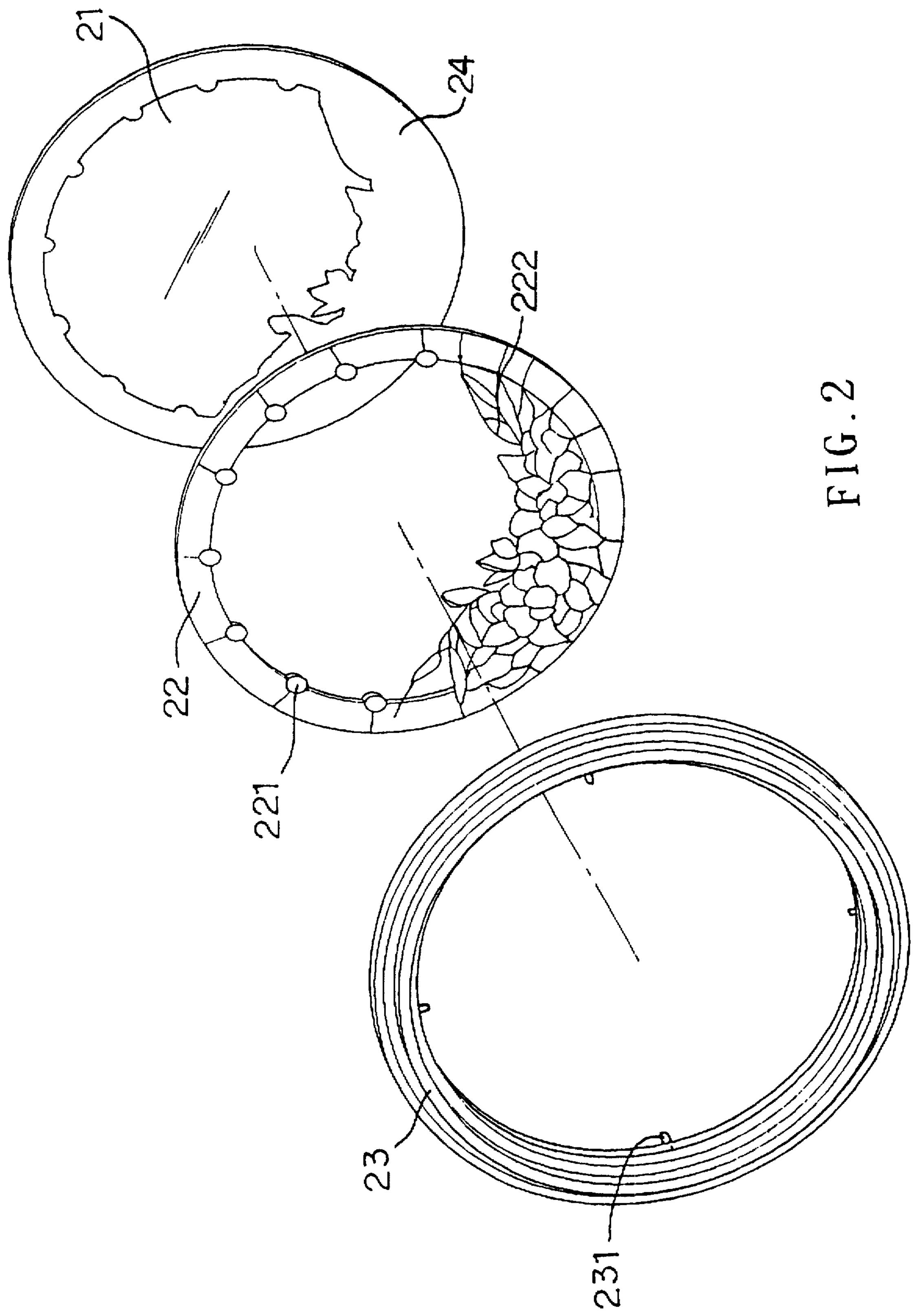
FIG. 2 is an exploded perspective view showing the components of the present invention.
Figure 3:
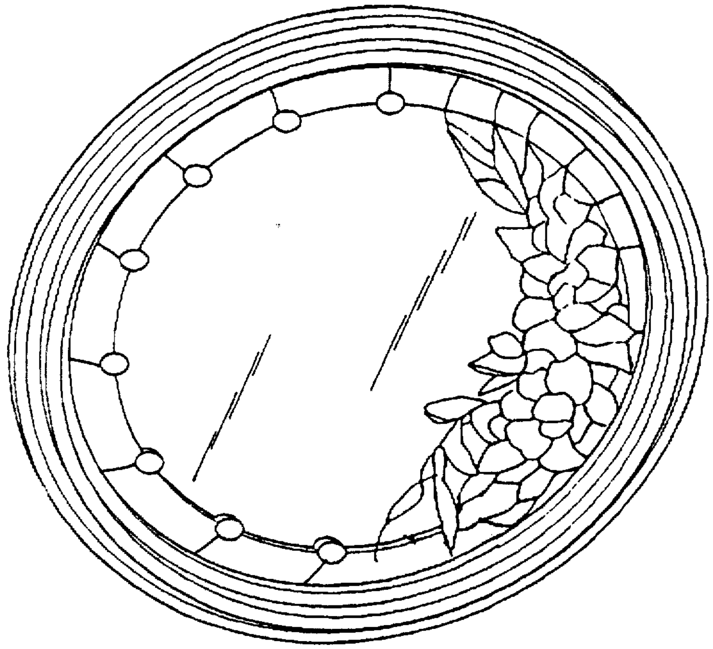
FIG. 3 is a perspective view showing the assembly of the present invention.

Referring to FIGS. 2, 3, the present invention mainly comprises a mirror 21, an attachable decorative bracket 22 and an outer frame 23.

The mirror is an integral piece of glass and is not cut at all, thus preventing it from damage during processing. The mirror 21 can be coated with mercury only on the central portion and the boundary thereof and can be processed by sand blasting to provide a frosted glass portion 24.

The attachable decorative bracket 22 has decorative patterns 222 made of acrylic, color glass, metal, shells, agate, jewelry, wood, fossil and etc. The different materials can be processed according to their respective natural characteristics to make the decorative patterns created in more abundant and versatile and without any limits as in glass processing. For example, many animal and plant patterns can be applied and many irregular shapes of design can be used in an unlimited way. The different materials of the decorative patterns can make the reflection of light of different kinds of lamps fascinating and appealing to the eyes. All the inner and outer rims of the bracket 22 are specially processed by attaching U-shaped copper edges 221 to prevent the joined portions from detaching and to reinforce the structure.

The mirror 21 and the decorative bracket 22 are first placed against each other and then an outer frame 23 is used to enclose both and fix the same by way of retaining members 231. Such a product use no welding and no chemicals to avoid removal of the mercury during the processing. The outer frame 23 can be designed in any shape and form as desired. Besides, the frosted glass portion of the mirror can let the light beams of the sun or lamps pass through and create harmonious light, making the mirror appeal to the eyes as an artistic piece when hanging on a window or any like place.

The mirror 21 and the decorative bracket 22 are separately assembled, so if the mirror 21 is damaged or scratched, it can be removed by simply releasing the retaining members 231 of the outer frame 23 and replacing mirror 21 with a new one.

I claim:

1. A mirror and frame assembly comprising:
   - a) an integral mirror portion having a front side and a boundary area;
   - b) a detachable decorative bracket disposed at the front side of the mirror portion, the bracket having an open central portion for exposing the mirror portion therethrough, a boundary portion covering the boundary area of the mirror portion and a plurality of decorative patterns mounted to the boundary portion; and
   - c) the boundary area of the mirror portion being sand blasted to provide a frosted glass surface for permitting light to pass therethrough.

2. The mirror and frame assembly of claim 1 wherein the bracket includes an inner rim and an outer rim, and a plurality of U-shaped edge members covering the inner and outer rims for forming a smooth and firm structure.

3. The mirror and frame assembly of claim 1 wherein the decorative patterns are formed from different materials.

4. The mirror and frame assembly of claim 1 wherein the outer frame is formed from a material selected from the group consisting of wood, rattan, resin and metal.

* * * * *